3,082,061
PRODUCTION OF POTASSIUM FLUOSILICATE
Raymond L. Barry, Lakeland, and Woodrow W. Richardson, Auburndale, Fla., assignors to International Minerals & Chemical Corporation, a corporation of New York
No Drawing. Filed Sept. 19, 1960, Ser. No. 56,688
4 Claims. (Cl. 23—88)

The present invention generally relates to the treatment of complex salts containing magnesium sulfate and potassium sulfate. More particularly the invention relates to a process for separately preparing potassium compounds and magnesium compounds from langbeinite, leonite, and/or schoenite.

Complex salts containing magnesium sulfate and potassium sulfate occur naturally in many potash ores, such as the potash ores that are found in the Permian Basin of the southwest area of the United States and mined chiefly in the Carlsbad district of New Mexico. It is frequently desirable to separately recover the potassium values and/or magnesium values from these complex salts and many processes to effect the separation have been developed.

Heretofore, the potassium values in langbeinite ore have been recovered by reacting langbeinite with an aqueous solution of potassium chloride to produce potassium sulfate. The potassium sulfate was crystallized from the solution and recovered, for example, by filtration. The potassium sulfate mother liquor could then be processed by one or another procedure to recover the magnesium values therefrom. This process for recovering potassium values from langbeinite, however, requires a high purity potassium chloride.

It is an object of the present invention to provide a new method for the separation of the potassium values from the magnesium values in these complex salts.

It is a further object of the present invention to provide a method for the preparation of potassium fluosilicate from complex salts containing magnesium sulfate and potassium sulfate.

It is another object of the present invention to provide a method for the preparation of potassium fluosilicate and magnesium sulfate from complex salts containing magnesium sulfate and potassium sulfate and fluosilicic acid.

These and other objects and advantages of the present invention will be apparent to those skilled in the art as the description of the present invention progresses.

Generally described, the present invention is a method which comprises reacting a complex salt containing magnesium sulfate and potassium sulfate with fluosilicic acid to form potassium fluosilicate, and separating solid potassium fluosilicate from the resulting solution.

As hereinbefore set forth, complex salts containing magnesium sulfate and potassium sulfate occur naturally in many potash ores. Examples of complex salts contemplated as starting materials in the process of this invention are the sulfates of potash magnesia, specifically the double salts, langbeinite (2MgSO₄·K₂SO₄), leonite (MgSO₄·K₂SO₄·4H₂O), and schoenite (MgSO₄·K₂SO₄·6H₂O)

These complex salts may be utilized in pure or impure form, with the higher grades being preferred.

Since the reaction of these complex salts with the fluosilicic acid takes place in an aqueous medium, aqueous solutions of these salts may be used; however, solid salts, such as substantially dry complex salts, may also be admixed with the fluosilicic acid. Mixtures of two or more of the complex salts may also be used in the process of this invention. The use of the complex salts in solid form has certain advantages and is, therefore, preferred.

When the complex salts are used in aqueous solution, any suitable concentration may be used since the concentration is not a critical factor. It is, however, preferred to use concentrated solutions, which may be saturated solutions. The complex salts may contain water insoluble materials and these are preferably removed from the aqueous solutions of the complex salts prior to mixing with the fluosilicic acid. The water insoluble solids may be removed by any suitable method such as filtration, centrifugation, etc. When the complex salt containing magnesium sulfate and potassium sulfate is dissolved in water, the resultant aqueous solution contains magnesium ions, potassium ions and sulfate ions.

When the complex salts are used in solid form, they are preferably in subdivided form smaller than 20 mesh and more preferably smaller than 100 mesh. The solid complex salts may, of course, be slurried in water or other aqueous solution before admixing with the fluosilicic acid.

Fluosilicic acid from any suitable source may be used. As is well known, fluorine-containing gases are produced during the manufacture of fertilizers, phosphoric acid, phosphates and other phosphorus-containing materials from phosphorus-containing minerals such as fluorapatite and phosphate rock. These minerals contain fluorine as well as silica, iron, and other elements. When such minerals are chemically treated with an acid, such as phosphoric acid, sulfuric acid, nitric acid, hydrochloric acid, or mixtures of two or more of these acids, which type of treatment is relatively common in preparing more useful materials from these minerals, silicon tetrafluoride is liberated. Silicon tetrafluoride is also liberated when wet process phosphoric acid prepared from phosphate rock or fluorapatite is concentrated by evaporation techniques. The liberated silicon tetrafluoride is usually recovered by absorption in water or other aqueous solution. When the silicon tetrafluoride is dissolved in water, fluosilicic acid, $H_2SiF_6$, is formed.

While the present invention finds particular utilization in preparing potassium fluosilicate from fluosilicic acid obtained by absorbing the gases evolved during an acid treatment of phosphate material in an aqueous medium, it is to be understood that aqueous fluosilicic acid solutions from other sources may be used in the process of this invention.

The concentration of the fluosilicic acid is not a critical factor and any suitable concentration may be used. It is preferred that from about 2% to about 30% by weight fluosilicic acid be used and more preferably from about 12% to about 30% by weight fluosilicic acid, since good results have been obtained when using acid of these concentrations.

The reaction between the fluosilicic acid and the complex salt containing magnesium sulfate and potassium sulfate takes place in aqueous solution at ambient conditions. In general, temperatures within the range of from about 60° F. to about 180° F. may be utilized; however, lower or higher temperatures may be used when desired.

The reaction of langbeinite with fluosilicic acid may be represented as follows:

$$K_2SO_4 \cdot 2MgSO_4 + H_2SiF_6 \rightarrow K_2SiF_6 + H_2SO_4 + 2MgSO_4$$

The reaction of leonite with fluosilicic acid may be represented as follows:

$$K_2SO_4 \cdot MgSO_4 \cdot 4H_2O + H_2SiF_6 \rightarrow$$
$$K_2SiF_6 + H_2SO_4 + MgSO_4 + 4H_2O$$

The reaction of schoenite with fluosilicic acid may be represented as follows:

$$K_2SO_4 \cdot MgSO_4 \cdot 6H_2O + H_2SiF_6 \rightarrow$$
$$K_2SiF_6 + MgSO_4 + H_2SO_4 + 6H_2O$$

When the complex salt is in aqueous solution, the solution of the salt and the fluosilicic acid may be admixed together at a high rate, that is almost immediate mixing of these reactants may be effected. The solution of the salt may, however, be admixed with the fluosilicic acid at a slower rate. For example, the solution of the complex may be introduced to a tank of fluosilicic acid at a rate at which one hour is utilized to introduce the predetermined amount of complex salt solution. Agitation is preferably effected during the admixing and for a period thereafter.

When the complex salt is introduced as a solid, it is, however, preferred to add the predetermined amount of the solid complex salt over a period of at least 15 minutes and more preferably over a period of at least 30 minutes. It is also preferred to agitate the mixture during the addition of the solid complex salt so as to effect good contact of the complex salt with the fluosilicic acid. After the predetermined amount of the solid complex salt is added, the agitation may be continued, preferably for at least 15 minutes.

The complex salt and the fluosilicic acid solution are admixed in any desirable ratio; however, it is preferred that the amount of fluosilicic acid is at least 75% of the stoichiometric amount, and preferably within the range of from about 75% to about 125% of the stoichimetric amount. It is still more preferred that an excess of fluosilicic acid be present, generally within the range of from about 102% to about 125% of the stoichiometric amount.

The reaction of the complex salts with the fluosilicic acid produces a solid potassium fluosilicate ($K_2SiF_6$) precipitate. The potassium fluosilicate is relatively insoluble in the resultant solution and high yields are obtained. The magnesium sulfate is much more soluble in water than the potassium fluosilicate and at the conditions obtaining remains in solution. The solid potassium fluosilicate may be separated from the resultant solution by any suitable method, such as, inter alia, centrifugation and/or filtration. The potassium fluosilicate is relatively water insoluble and it may, therefore, be readily water washed to remove the magnesium sulfate and/or sulfuric acid.

As hereinbefore set forth, it is preferable to add the complex salt as a solid. By adding the complex salt as a solid, either dry, or in slurry form, the amount of resultant solution is reduced since no dilution, or when a slurry is utilized only a small amount of dilution, takes place when the complex salt is admixed with the fluosilicic acid. The crystallizing and mixing equipment may, accordingly, be of smaller size. Further the filtration and/or centrifuging equipment may also be of smaller size since the amount of mother liquor must be separated from the potassium fluosilicate is less. Still further, since the amount of the solution is less, any losses of potassium fluosilicate due to its solubility in the solution are reduced.

The potassium fluosilicate mother liquor containing magnesium sulfate and sulfuric acid may be treated to crystallize out magnesium sulfate as epsomite $$(MgSO_4 \cdot 7H_2O)$$

The potassium fluosilicate mother liquor containing the magnesium sulfate is preferably concentrated and then cooled to a temperature below about 104° F., but above the freezing point of the cooled solution, so that epsomite crystallizes from the cooled solution. The epsomite may then be separated from the magnesium sulfate solution by any suitable means, such as, inter alia, filtration and/or centrifugation. The epsomite crystals may be washed free of sulfuric acid with a suitable liquid, such as, for example, a solution of $MgSO_4$, and then dried.

The potassium fluosilicate mother liquor may, however, be concentrated to a greater degree so as to crystallize out substantially all of the magnesium sulfate, together with some sulfuric acid as mixed salts, for example, $MgSO_4 \cdot 3H_2SO_4$. These mixel salt crystals may be separated from the magnesium sulfate mother liquor which is a relatively pure sulfuric acid solution These mixed salts containing magnesium sulfate and sulfuric acid may be treated with a suitable magnesium compound such as $MgO$ or $MgCO_3$, etc. to netralize the sulfuric acid, when substantially pure $MgSO_4$ is desired. At least a portion of the sulfuric acid solution may be used, with additional sulfuric acid when desirable, to react with at least a portion of the $K_2SiF_6$ produced to produce potassium sulfate $(K_2SO_4)$. This reaction may be represented as follows:

$$K_2SiF_6 + H_2SO_4 \rightarrow K_2SO_4 + SiF_4 + 2HF$$

The silicon tetrafluoride and hydrogen fluoride gases evolved may, of course, be absorbed in water to produce fluosilicic acid. At least a portion of this fluosilicic acid may then be recycled to the beginning of the process; that is, it may be reacted with the complex salts containing potassium sulfate and magnesium sulfate.

The $K_2SiF_6$ produced in the process may be dried and recovered and/or converted to other potassium compounds, such as, inter alia, potassium sulfate as hereinabove set forth.

In order to give a fuller understanding of the invention, but with no intention to be limited thereto, the following specific example is given.

*Example I*

740 grams of a 20% fluosilicic acid solution contaiminated with about 14.3 grams of P as phosphoric acid was diluted with 500 ml. of water.

423 grams of dry powdered langbeinite of —40 mesh, analyzing 18.5% K, was mixed with the diluted acid and the admixture was stirred for about 16 hours at room temperature. The result was a reddish brown slurry of $K_2SiF_6$. The reaction mass was filtered, and the filter cake of $K_2SiF_6$ was washed with water. The potassium fluosilicate was of high purity as shown by the following impurity analysis of the product.

|  | Percent by weight |
|---|---|
| $PO_4$ | 0.036 |
| $SO_4$ | 0.19 |
| $Mg$ | 0.024 |

The filtrate contained only 0.02% K indicating a substantially complete recovery of the potassium values in the langbeinite in the potassium fluosilicate filter cake.

The description of the invention utilized specific reference to certain process details; however, it is to be understood that such details are illustrative only and not by way of limitation. Other modifications and equivalents of the invention will. be apparent to thise skilled in the art from the foregoing description.

We claim:

1. A method for the production of potassium fluosilicate substantially free of phosphorus and magnesium contamination from fluosilicic acid contaminated with a substantial amount of phosphorus as phosphoric acid and a complex salt containing magnesium sulfate and potassium sulfate which comprises reacting a complex salt containing magnesium sulfate and potassium sulfate selected from the group consisting of langbeinite, schoenite, leonite, and mixtures thereof, with a stoichiometric excess of said fluosilicic acid contaminated with phosphorus, thereby forming solid potassium fluosilicate, and separating the resultant solid potassium fluosilicate substantially free of phosphorus and magnesium contamination from the resulting solution.

2. The method of claim 1 wherein said complex salt is langbeinite.

3. The method of claim 1 wherein said complex salt is schoenite.

4. The method of claim 1 wherein said complex salt is leonite.

References Cited in the file of this patent

UNITED STATES PATENTS

| | | |
|---|---|---|
| 2,354,177 | Kawecki | July 18, 1944 |
| 2,780,522 | Glass et al. | Feb. 5, 1957 |
| 2,809,093 | Dancy | Oct. 8, 1957 |

FOREIGN PATENTS

| | | |
|---|---|---|
| 226,491 | Great Britain | Nov. 2, 1925 |
| 261,991 | Great Britain | Dec. 2, 1926 |

OTHER REFERENCES

Mellor; "Comprehensive Treatise on Inorganic and Theoretical Chemistry," vol 6, pages 944, 947, 948, 949 and 953 (1925); vol. 4, page 340 (1923), Longmans, Green and Co., New York.